March 4, 1924.
C. A. BRAWN
STONE CRUSHER
Filed Aug. 29, 1921
1,485,955
2 Sheets-Sheet 1
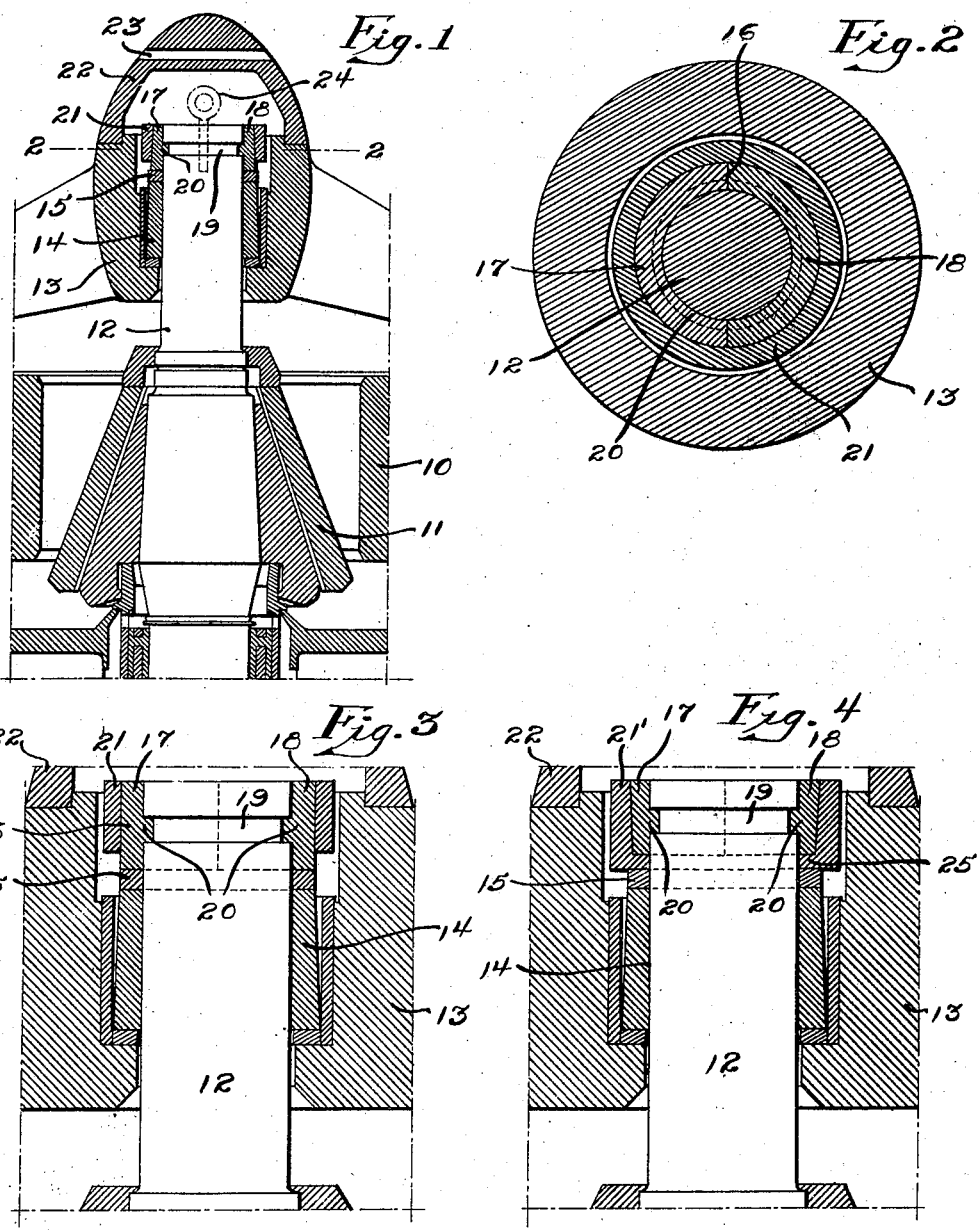

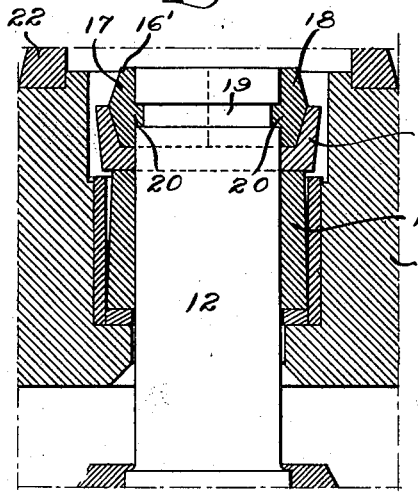
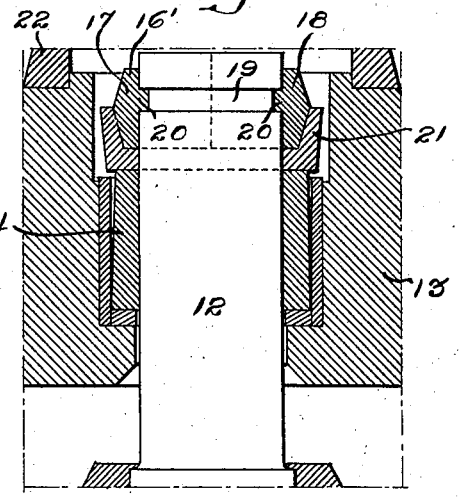
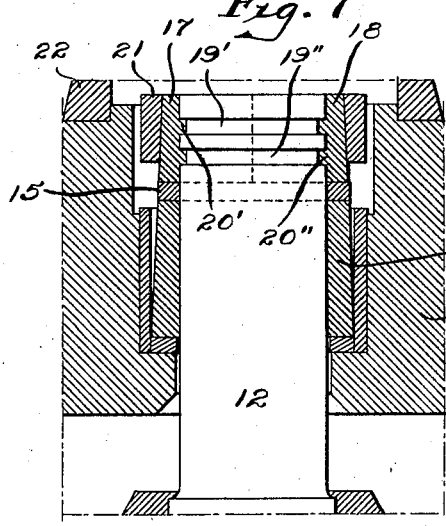
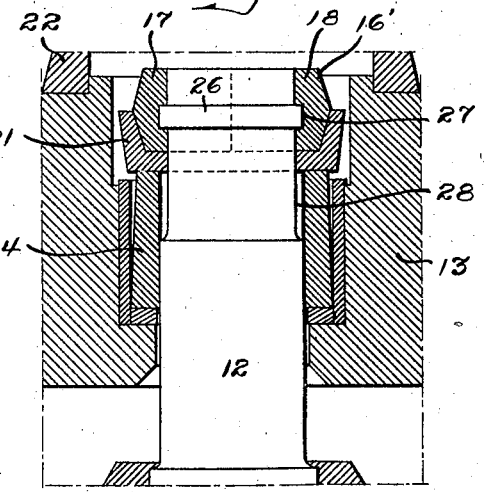

Patented Mar. 4, 1924.

1,485,955

UNITED STATES PATENT OFFICE.

CHARLES A. BRAWN, OF PHILADELPHIA, PENNSYLVANIA, ASSIGNOR TO BIRDSBORO STONE COMPANY, OF PHILADELPHIA, PENNSYLVANIA.

STONE CRUSHER.

Application filed August 29, 1921. Serial No. 496,331.

*To all whom it may concern:*

Be it known that I, CHARLES A. BRAWN, a citizen of Philadelphia, residing at Philadelphia, in the county of Philadelphia and State of Pennsylvania, have invented certain new and useful Improvements in Stone Crushers, of which the following is a specification.

My invention relates to stone crushers and particularly to the means for suspending the shaft of the gyratory cone.

In stone crushers of the class wherein the cone rotates upon a vertical axis, the upper end of the cone shaft is provided with a suspension bearing, and this includes an adjusting nut by means of which the shaft may be raised or lowered to adjust the cone with relation to the concave. The strain upon the parts in operation results in a mutilation of the threads so that it becomes difficult to adjust said nut or to remove the same.

The object of my invention is to provide a suspension device for the cone shaft in which the above mentioned nut is eliminated, and by means of which the cone may be adjusted as desired. Further objects of my invention are to provide a device as mentioned which shall be of simple construction, which shall not readily get out of order, and which may be easily and quickly operated to make the desired adjustments. Other objects will appear hereinafter.

With these objects in view my invention consists generally in a split suspension collar arranged about the upper end of the cone shaft, a flange and groove connection between said collar and shaft, and means for maintaining said collar in position. My invention further consists in a device as mentioned in which said flange and groove connection is at a greater distance from one end of said collar than from the other, to the end that a mere reversal of the collar will vary the relation between the cone and groove. My invention also contemplates the employment of spacing rings upon which the suspension collar or its retaining ring rests, and in providing these rings of different thicknesses, so that further adjustments may be made by employing a ring of the desired thickness. My invention further consists in various details of construction, and in the combinations and arrangements of parts all as will be fully described hereinafter and particularly pointed out in the claim.

My invention will be more readily understood by reference to the accompanying drawings forming a part of this specification and in which—

Fig. 1 is a detail vertical section through a portion of a stone crusher, illustrating my invention applied thereto, Fig. 2 is a horizontal section on substantially the line 2—2 of Fig. 1, upon an enlarged scale, Fig. 3 is a detail vertical section illustrating a modified form of the invention, and Figs. 4 to 8 inclusive are similar views illustrating further modifications.

Referring now to the drawings, and particularly to Figs. 1 and 2 thereof, 10 indicates a crusher of the type wherein the cone 11 rotates upon a vertical axis. 12 indicates the cone shaft, the upper end of which is provided with bearings in a supporting head 13. A supporting ring 14 is provided within the head 13 upon which rests a spacing ring 15. Surrounding the upper end of the shaft 10 is a split collar 16 comprising similar halves 17 and 18. This collar rests upon the spacing ring 15 and supports the shaft 12, and to this end a flange and groove connection is provided between said collar and the shaft. As illustrated in Figs. 1 to 7 inclusive, the upper end of the shaft is formed with an annular groove 19, and the inner faces of the collar sections are provided with flanges 20 co-operating therewith to support the shaft and permit rotation thereof. 21 indicates a retaining ring surrounding the split collar 16 and holding the parts thereof in operative position upon the end of the shaft. As illustrated in Fig. 1, the outer face of the collar 16 is tapered and the bore of the ring 21 is correspondingly shaped. In Fig. 3 I have illustrated a slight modification in which the adjacent face of the collar and retaining ring are cylindrical.

In Fig. 7 I have illustrated a further modification wherein the shaft is provided with two grooves 19' and 19", and the collar 16 with two corresponding flanges 20' and 20".

22 indicates a dust bonnet resting upon the head 13 to exclude dust from the bearings, and 23 indicates a hole therein, through which a bar or suitable instrument may be inserted for removing the same.

It will be noted in the forms of the device so far described that the flange or flanges 20 are further removed from one end of the collar 16 than from the other. With this construction, it is obvious that the shaft 10 may be adjusted vertically by merely reversing the collar 16. However, this provides for but one adjustment, but further adjustment may be made by substituting for the rings 15 a ring or rings of different thicknesses, thereby raising or lowering the shaft 12.

In operation, to make an adjustment, the dust bonnet is first removed and an eye bolt 24 is screwed into the upper end of the shaft and the shaft is lifted by means of a crane or other suitable device. The ring 21 is removed, after which the split collar may be readily removed and reversed, and the retaining ring 21 replaced. If further adjustment is necessary the spacing ring 15 may be removed and replaced by a similar ring of greater or less thickness.

In Fig. 4 I have illustrated a further modification wherein the retaining ring 21' is provided at its lower edge with an inwardly extending flange 25 which extends beneath the collar 16. In this form, the collar 16 is downwardly tapered and the inner face of the ring 21' is correspondingly shaped. It is obvious that when this construction is employed, the collar 16 cannot be reversed and adjustment is therefore made by means of the rings 15 of varying thicknesses.

In Figs. 5, 6 and 8, I have illustrated a form similar to that shown in Fig. 4, except that the collar 16' is tapered toward both ends so that the collar may be reversed to adjust the shaft. Fig. 5 illustrates the parts with the collar in one position, and Fig. 6 the same construction with the collar reversed.

In Fig. 8, I have illustrated a further modification showing a reversal of the groove and flange construction. As shown in this figure, the shaft is provided with an annular flange 26 and the collar 16' is formed with a corresponding groove 27. With this construction, I prefer to reduce the diameter of the upper end of the shaft 12 as indicated at 28. Otherwise, this construction is similar to that shown in Figs. 5 and 6, but it is obvious that this reversal of the groove and flange construction may also be applied to the forms shown in Figs. 1 and 3.

I claim:—

In a device of the class described, the vertical shaft in combination with a split collar arranged about the upper portion thereof, and an annular flange and groove connection between said shaft and collar, said connection between said shaft and collar being arranged at a greater distance from one end of said collar than from the other, as and for the purpose specified.

In testimony whereof I have signed my name to this specification in the presence of two subscribing witnesses.

CHAS. A. BRAWN.

Witnesses:
 E. LAURENCE WEBSTER,
 CHAS. J. KRAUS, Jr.